July 24, 1956 S. APOSTOLESCU 2,755,866
TANDEM HELICOPTER Filed Sept. 25, 1953 5 Sheets-Sheet 1

INVENTOR.
STEFAN APOSTOLESCU
BY
Edw. S. Higgins
ATTORNEY

July 24, 1956  S. APOSTOLESCU  2,755,866
TANDEM HELICOPTER
Filed Sept. 25, 1953  5 Sheets-Sheet 4

INVENTOR.
STEFAN APOSTOLESCU
BY
Edw. S. Higgins
ATTORNEY

United States Patent Office 2,755,866
Patented July 24, 1956

2,755,866

TANDEM HELICOPTER

Stefan Apostolescu, New York, N. Y.

Application September 25, 1953, Serial No. 382,305

11 Claims. (Cl. 170—135.24)

This invention relates to helicopters and more particularly to jet propelled helicopters.

A primary object of the present invention is to provide a helicopter with rotor units at both ends of the fuselage driven by jet engines.

A further object of the invention is to provide a helicopter with upper and lower blades, said blades supporting jet engines for propelling the helicopter.

Another object of the invention is to provide a helicopter with improved pitch control mechanism for rotor blades which will permit convenient and ready adjustment of the pitch angles.

Yet another object of the invention is to provide a helicopter of this type with upper and lower blades arranged in pairs and operatively connected so that they move in unison.

Still another object of the invention is to provide in a helicopter, a novel blade construction for the rotary operating units together with a novel mounting means for such units whereby the vertical and forward movements of the machine in the air may be readily accomplished.

A still further object of the invention is to provide in a helicopter, rotary blade units in which the blades are of novel form and mounted so that the angle of attack may be varied, the said means for adjusting the pitch of the blades together with the novel form of the blades facilitating movement of the ship in the air vertically, forwardly or laterally as may be desired without the employment of steering mechanism of any character.

Another object of the invention is to provide improved mounting means for the rotor blades for controlling the angle of pitch or the angle of incidence or the cyclic pitch of the blades, for preventing vibration of the blades and for retracting such blades when not in use.

Another object of the invention is to provide a helicopter with a rotor unit at each end of the fuselage, the rotor unit at the rear end being arranged above the rotor unit at the front end and being free from the turbulent air created by the front rotor blades.

Yet another object of the invention is to increase the stability, the speed, the lifting power and the over-all efficiency of multi-rotor helicopters.

For a further comprehension of the invention and of the objects and advantages thereof, reference will be had to the following description and accompanying drawings, and to the appended claims in which the various novel features of the invention are more particularly set forth.

In the accompanying drawings forming a material part of this disclosure.

Referring to the drawings in detail, the improved helicopter comprises a fuselage body 5 provided with landing gear wheels 6 at its sides and with conventional airfoils 7 for steering at its rear. The fuselage body is streamlined and may be of any design suitable for travel in the air, on land or on water. The fuselage body is also provided with side doors 8 and a lower rear door 9 for providing access to the interior of the fuselage body for any desired purpose. Elongated windows 10 are also formed in the side walls of the fuselage body.

The helicopter is driven by rotor units positioned at the front and at the rear of the fuselage body 5. The rotor units are similar in construction and each unit comprises a hollow drum or housing 11 having a top wall 12 including hinged sections 13 and 14, a side wall 15 and a bottom wall 16 having a central shaft portion 17 depending therefrom and formed with a central opening 18 therethrough. The shaft portion 17 extends partially through an opening 19 in the top wall 20 of the fuselage body 5 and is formed with a flange 21 remote from its bottom end. A sleeve member 22 forms an extension of the lower end of the shaft portion 17 and is suitably secured thereto. The sleeve member 22 is also formed with a flange 23 and carries an integral bevel gear ring 24 at its lower end. The shaft portion 17 and the sleeve member 22 rotate on upper and lower ball bearings 25 and 26, respectively, seated between the shaft portion and the top wall 20 and between the sleeve and top wall.

Figure 3:
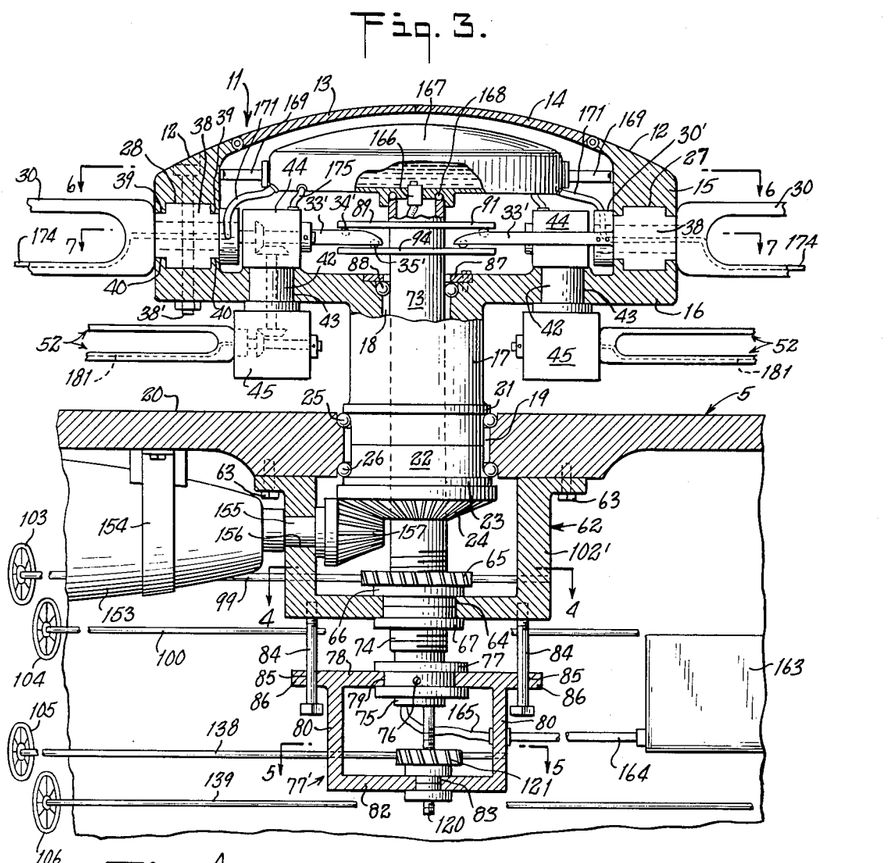
Fig. 3 is an enlarged vertical sectional view taken on the plane of the line 3—3 of Fig. 1.
Figure 4:
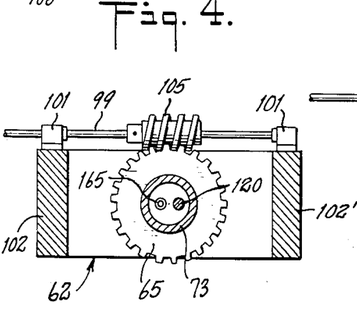
Fig. 4 is a sectional view taken on the plane of the line 4—4 of Fig. 3.
Figure 5:
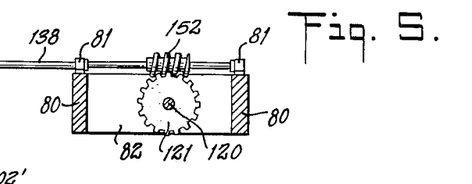
Fig. 5 is a sectional view taken on the plane of the line 5—5 of Fig. 3.

The side wall 15 of the drum is formed with an opening 27 disposed parallel to the longitudinal axis of the fuselage body 5 as viewed in Fig. 3 and with elongated arcuate-shaped slotted or cutaway portions 28 and 29 extending around at opposed sides of the drum. A rotor blade 30 is mounted in the opening 27 and in each of the cutaway portions 28 and 29.

Each of the upper blades 30 consists of an elongated paddle-shaped body having a base portion 31 and a nose portion 32. The base portion is formed with a hub portion 33 of reduced diameter continuing into an elongated extension 34 of reduced diameter. The body portion is open at its sides to provide upper and lower planes or airfoils 35 and 36, respectively. A paddle-like strut member 37 extending diagonally between the planes or airfoils is provided for connecting and bracing the planes. A bearing or sleeve member 38 encircles the hub portion 33 of the blade and is provided with slightly curved upper grooves 39 and with slightly curved lower grooves 40 formed in its outer surface at its ends. A bolt 38' passing through the side wall 15 of the drum and across the cutaway portion alongside the bearing member 38 secures the blade against lateral displacement or vibration.

A plurality of bearing or anchor members 41 are rotatably supported by the bottom wall 16 of the drum at equally spaced points therearound and in line with the opening 27 and the cutaway portions 28 and 29 in the side wall 15 of the drum. Three of such anchor or bearing members are shown, one for each upper blade 30. Each bearing or anchor member 41 comprises a tubular body portion 42 rotatably mounted in an opening 43 formed in the lower wall 16 of the drum. A box-like portion 44 is formed integrally with the top of the tubular portion inside the drum, and a similar box-like portion 45 is formed integrally with the bottom of the tubular portion outside the drum. The upper box-like portion 44 is formed with opposed openings 46 and 47 in its end walls through which the tubular extension 34 of the adjacent upper blade 30 projects. The extension 34 is fastened in position by a pin 48 passing through a collar 49 on the outer projecting end of the extension. The lower box-like portion 45 is formed with similar opposed openings 50 and 51 in its end walls.

Suitably fastened in the hub portion 33 of each blade 30 is a collar 30' and formed integrally with the collar and extending laterally therefrom and outwardly along the anchor member 41 is an arm member 33'. The arm member is thus eccentrically disposed with relation to the axis of the blade. The outer free end of the arm member is curved and carries upper and lower ball bearings 34' and 35', respectively.

Figures 1, 2:
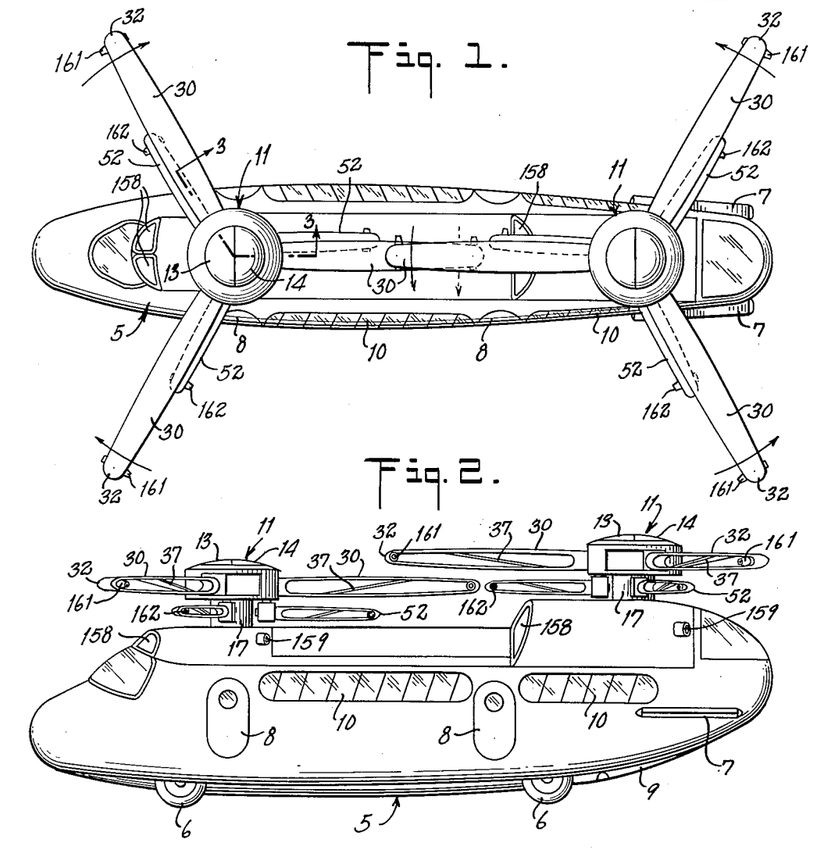
Fig. 1 is a top plan view of a helicopter embodying my invention.
Fig. 2 is a side view theerof in elevation.

A lower rotor blade 52 projects radially from and is supported by each lower box-like portion 45 of each anchor member 41, below each upper blade 30, with its longitudinal axis offset from the axis of the upper blade and with its leading edge spaced behind the leading edge of the upper blade and with its trailing edge extending laterally or behind the trailing edge of the upper blade as shown in Fig. 1 so that additional lifting power is effected, the lower blade utilising to that effect the flow of air which is pushed downwards by the upper blade during its rotation. The lower blade 52 is constructed similarly to the upper blade 30 but is smaller in dimensions. The lower blade consists of an elongated paddle-shaped body having a base portion 53 and a nose portion 54. The base portion is formed with a hub portion 55 of reduced diameter continuing into an elongated extension 56 of reduced diameter, the extension 56 projecting through the opposed openings 50 and 51 in its end walls, and being fastened in position by a pin 57 passing through a collar 58 on the outer projecting end of the extension. The body portion is open at its sides to provide upper and lower planes or airfoils 59 and 60, respectively. A strut member 61 extending diagonally between the planes is provided for connecting and bracing the planes.

Figure 11:
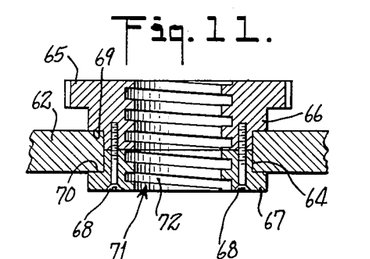
Fig. 11 is an enlarged sectional view showing the mounting for the upper worm gear.

A U-shaped bracket 62 is secured to the under surface of the top wall 20 of the fuselage body 5 by bolts 63 and is formed with a central opening 64. A worm gear ring 65 is mounted in the opening 64 and includes an upper hub section 66 and a lower hub section 67, said hub sections having reduced ends which pass through the opening 64 and are fastened together by screws 68. The reduced end portion of the hub sections provide upper and lower shoulders 69 and 70, respectively, which are clamped against the bracket 62 thus fastening the worm gear ring 65 thereto. The gear ring 65 is formed with a central opening or passage 71 provided with internal screw threads 72 (see Fig. 11). A tube 73, with external screw threads 74 at its lower end, is movably supported in a vertical position by the gear ring 65. The tube extends above and below the worm gear ring, projecting upwardly through the opening in the sleeve member 22 and the shaft portion 17 of the drum to the interior of the drum. The tube, below its screw threaded portion, is formed with a reduced end portion 75 and secured to this end portion by a screw 76 passing through a double-flanged sleeve member 77 is a closed frame 77' having a top 78, with a central opening 79 through which the sleeve member extends, sides 80 and a bottom 82 having a central opening 83. The frame is thus carried up and down with the tube but does not turn and is guided in such movements by bolts 84 depending from the bracket 62 and passing through holes 85 in extensions 86 on the top of the frame. A washer 87 closes the top of a raceway for ball bearings 88 formed in the upper surface of the bottom wall 16 of the drum.

Figures 6, 7, 8, 9, 10:
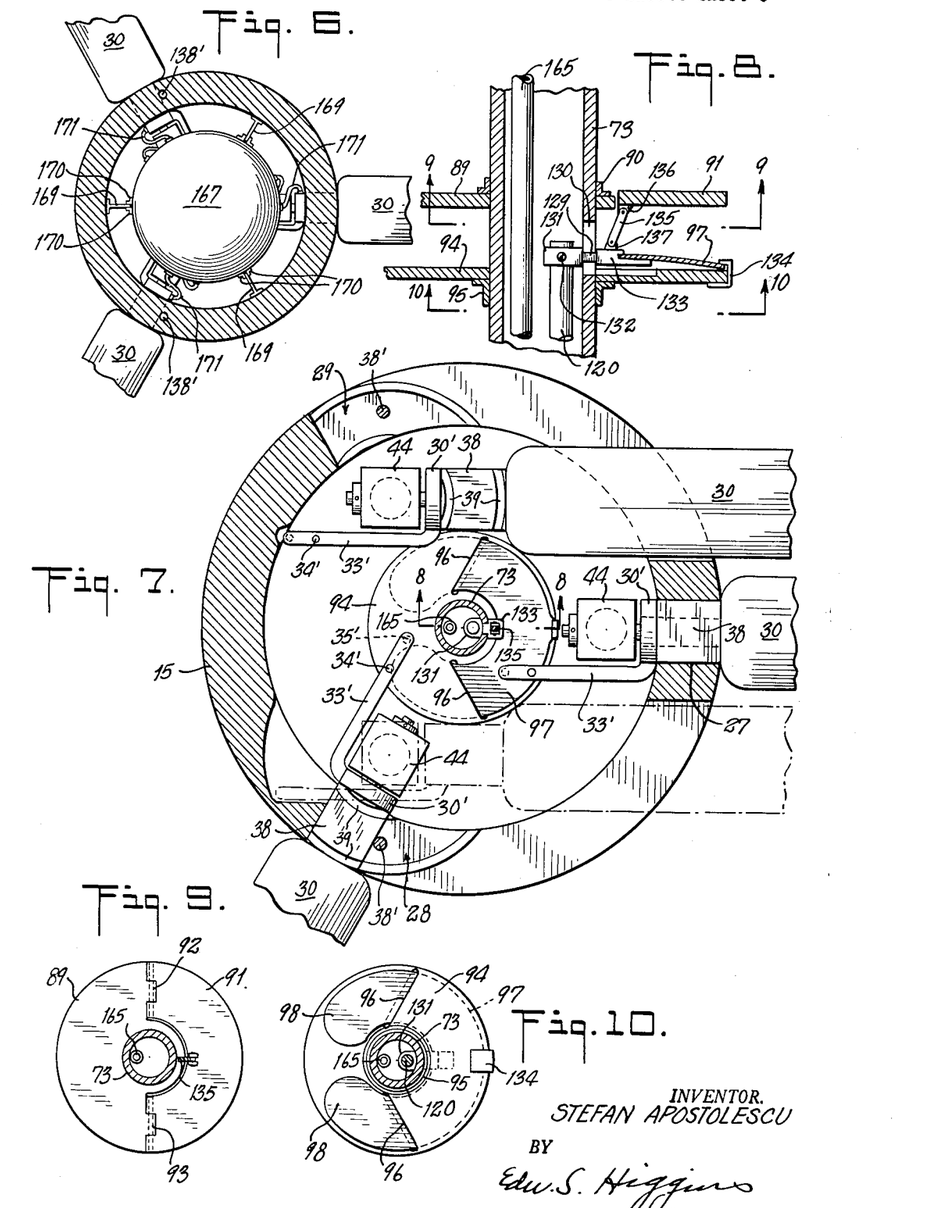
Fig. 6 is a sectional view taken on the plane of the line 6—6 of Fig. 3.
Fig. 7 is an enlarged sectional view taken on the plane of the line 7—7 of Fig. 3.
Fig. 8 is an enlarged sectional view taken on the plane of the line 8—8 of Fig. 7.
Fig. 9 is a sectional view taken on the plane of the line 9—9 of Fig. 8.
Fig. 10 is a sectional view taken on the plane of the line 10—10 of Fig. 8.

On the tube 73, adjacent its upper end inside the drum, there is an upper disc member comprising a fixed section 89 secured to the tube by a flanged ring 90 and a movable section 91 connected to the fixed section by hinged connections 92 and 93 whereby the movable section is adapted to move upwardly above the plane of the fixed section 89. Another disc member 94 is fixed to the tube 73 by a flanged ring 95 adjacent to but below the upper disc member. The lower disc member is formed with opposed slots 96 which are cut at an angle to a line running through the center of the disc member. A semi-circular camming plate 97 is positioned loosely over the upper surface of the lower disc 94 and covers approximately one-half of said upper surface. The ends 98 of the camming plate member 97 projects through the slots 96 to the underside of the disc member as shown in Figs. 7 and 10. The edge walls of the slots 96 serve as pivots for moving the camming plate 97 away from and towards the disc member 94.

The mechanism for changing the pitch of the rotor blades of the rotor units and holding said blades in fixed position for raising the helicopter in the air include elongated shafts 99 and 100, one end of each shaft extending through and being supported by brackets 101 on the opposed upright portions 102 and 102' of each member 62 of each rotor unit. The shafts 99 and 100 extend into the pilot's compartment of the fuselage and have hand wheels 103 and 104, respectively, fastened thereto.

Each of the shafts 99 and 100 passes adjacent to and in alignment with its respective worm gear ring 65 and fastened to each shaft in any suitable manner is a worm 105 in mesh with the worm gear ring 65 for turning the latter. When the worm gear ring is turned, the inner threads 72 thereon engaging the threaded end 74 of the tube, moves its respective tube 73 up and down. When the tube 73 moves upwardly or downwardly, it carries the upper and lower disc cam members 89 and 94, respectively, along with it. The inner ends of the arm members 33' of the upper blades 30 are disposed between the disc cam members 89 and 94 and are carried along therewith and by reason of their eccentric connections with the hub portions 33 of the upper blades 30, the arm members 33' are tilted which in turn tilt the blades 30 changing and fixing the angle of incidence or the pitch of the blades. The turning of each upper blade 30 to change its pitch is transmitted to the lower blade 52 which is in line therewith by means of a pinion 115 fixed on the extension 34 of the blade 30 inside the upper box-like portion 44 of the anchor member 41, meshing with a pinion 116 fixed on the upper end of a shaft 117 extending through the tubular portion 42 of the anchor member and into the lower box-like member 43 below the drum. A pinion 118 on the bottom end of the shaft 117 carries the drive to a pinion 119 fixed on the extension 56 of the lower blade 52. The pitch changing mechanism just described is for changing the pitch of the blades and holding it in fixed position for elevating the helicopter into the air.

Figure 12:
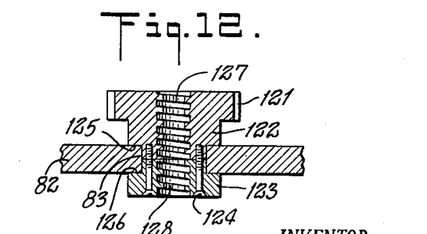
Fig. 12 is a similar view showing the mounting for the lower worm gear.
Figure 13:
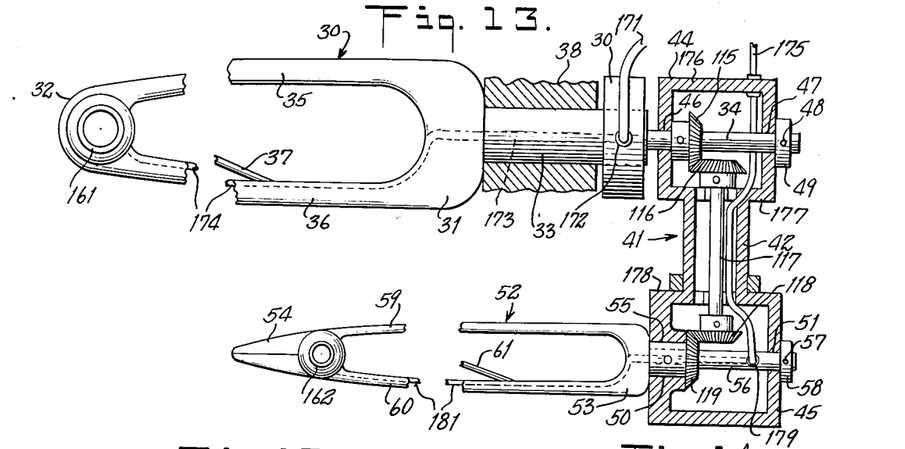
Fig. 13 is an enlarged partly sectional and partly elevational view of a rotor blade assembly, parts being broken away.

Additional and independent mechanism is provided for changing the cyclic pitch of the blades for the forward thrust or movement of the helicopter. This mechanism for each rotor unit includes an elongated shaft 120. A worm gear ring 121 is mounted on the bottom 82 of the closed frame 77' and includes an upper hub section 122 and a lower hub section 123 (Fig. 12). The opposed ends of the hub sections are reduced in diameter and pass through the central opening 83 in the bottom 82 of the frame, being fastened together by screws 124. The reduced ends provide upper and lower shoulders 125 and 126, respectively, which are clamped against the bottom 82 of the frame thereby fastening the worm gear ring thereto. The worm gear ring 121 is formed with a central opening or passage 127 having internal screw threads 128 (see Fig. 12). The shaft 120 which is externally threaded extends up through the threaded passage 127 of the gear ring 121, through the sleeve member 77 and through the tube 73 to a point between the disc camming members 89 and 94 as shown in Fig. 8. The upper end of shaft 120 carries an actuating bar 129 extending radially therefrom and through an elongated slot 130 formed in the tube 73. The bar is formed at one end with a ring 131 which encircles the shaft and is secured thereto by a screw 132. The other end of the bar has a bifurcated head or enlargement 133, the bifurcations of which clamp or grip the central portion of the inner edge of the movable plate camming member 97 of the lower camming disc member 94 therebetween, the opposed portion of the outer edge of the movable plate being fastened to the lower disc camming member 94 by a clip 134 so that the movable camming plate is adapted to be swung upwardly away from the lower disc camming member with the clip as a pivot. The movable section 91 of the upper disc camming member 89 is rigidly connected to the actuating bar by means of a rod 135 hingedly connected to a perforated ear 136 on said movable section and to a perforated ear 137 on the head portion of the actuating bar so that the up and down movements of the actuating bar are transmitted to said movable section of the upper disc camming member.

Elongated shafts 138 and 139 are provided for actuating the shafts 120 of the front and rear rotor units, respectively. One end of each of the shafts 138 and 139 extends through and is supported by brackets 81 on the sides 80 of the closed frame 77' of each rotor unit. The shafts 138 and 139 extend to the pilot's compartment and have hand wheels 105 and 106, respectively, fastened to their ends.

Each of the shafts 138 and 139 passes adjacent to and in alignment with its respective worm gear ring 121 at the lower end of the shaft 120, and fastened to each shaft in any suitable manner is a worm 152 in mesh with the worm gear ring 121 for turning the latter. When the worm gear ring is turned, it moves its respective shaft 120 up or down. When the shaft 120 moves up or down it carries the disc camming devices 91 and 97 along with it. When the shaft 120 moves upwardly, it moves the inner edge of the movable camming plate 97 upwardly around the clip 134 as a pivot, and due to the interlocking relations between the ends 98 of the movable plate member and the walls of the slots 96 of the disc camming member 94, the portion of the movable plate above the lower disc camming member assumes a curvature to provide a curved path or track. At the same time, the movable section 91 of the upper disc camming member 89 is moved upwardly by the rod 135.

Figures 21, 22, 24:
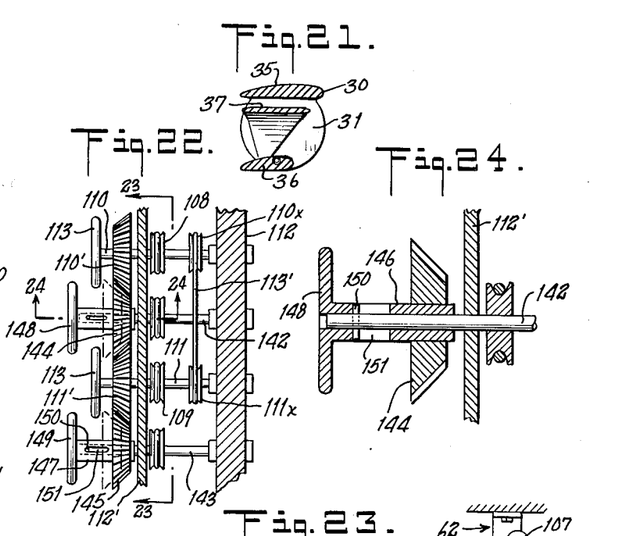
Fig. 21 is a cross sectional view taken on the plane of the line 21—21 of Fig. 18.
Fig. 22 is an enlarged fragmentary sectional view showing the driving and controlling mechanism for the actuating shafts.
Fig. 24 is an enlarged sectional view taken on the plane of the line 24—24 of Fig. 22.
Figures 23, 25:
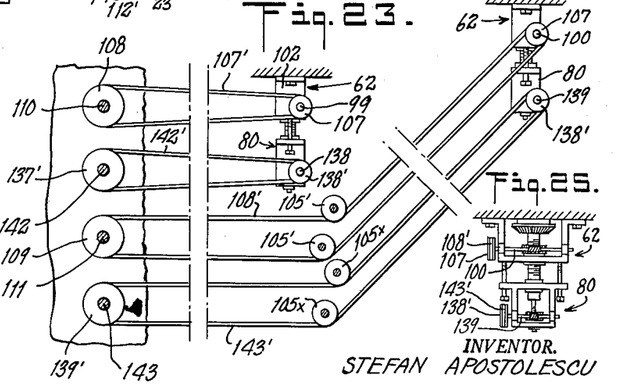
Fig. 23 is an enlarged schematic view showing the driving and controlling mechanism for the front and rear rotor units.
Fig. 25 is a detail elevational view of the bracket and associated parts shown in Fig. 23.

Modified mechanism for changing the pitch of the blades and for holding them in a fixed position and also for changing the cyclic pitch of the blades is shown in Figs. 22, 23 and 24. In this form of mechanism, each of the shafts 99 and 100 ends just outside the upright portion 102 of its bracket 62 and each has a pulley 107 fastened to said end. The pulleys 107 are connected to pulleys 108 and 109 on stub shafts 110 and 111, respectively, extending through and supported by sections of walls 112, 112' in the pilot's compartment, by wire belts 107' and 108', respectively. Idler pulleys 105' may be provided to guide the belt 108'. A hand wheel 113 is fixed on the free end of each stub shaft for manually turning the shaft. Bevel gear rings 110' and 111' are fastened to the shafts 110 and 111, respectively. The drive is brought from the stub shaft 110 to the stub shaft 111 by a belt 113' looped around pulleys 110x and 111x on the shafts 110 and 111, respectively, so that both shafts turn simultaneously.

Each of the shafts 138 and 139 also ends just outside the upright portion 80 of its closed frame support 77' and has a pulley 138' fastened to said end. The pulleys 138' are connected to pulleys 137' and 139' fixedly mounted on stub shafts 142 and 143, respectively, supported by walls 112, 112', by wire belts 142' and 143', respectively. Idler pulleys 105x may be provided to guide the belt 143'. The stub shafts are positioned adjacent to and in alignment with the stub shafts 110 and 111. Bevel gear rings 144 and 145 are slidably mounted on the ends of the shafts 142 and 143, respectively, and have elongated sleeves 146 and 147, respectively. Hand wheels 148 and 149 are fastened to the outer ends of the sleeves 146 and 147, respectively. Pins 150 on the stub shafts 142 and 143 projecting through slots 151 in the sleeves permit sliding movement of the sleeves and bevel gear rings and cause rotation of the stub shafts when the wheels are turned. This construction permits the bevel gear rings 144 and 145 to be slid into and out of engagement with the bevel gear rings 110' and 111' so that all of said gear rings may turn in unison. The threads on the bevel gear rings are such however that when the bevel gear rings 110' and 111' turn in a clockwise direction, the bevel gear rings 144 and 145 turn counterclockwise and vice versa in order to turn the front and rear rotors in opposite directions.

Figure 17:
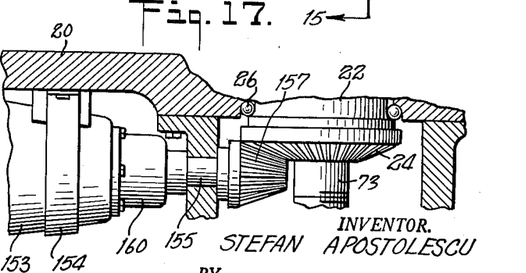
Fig. 17 is a fragmentary side elevational view showing the mechanism for driving one of the rotor units.
Figure 18:
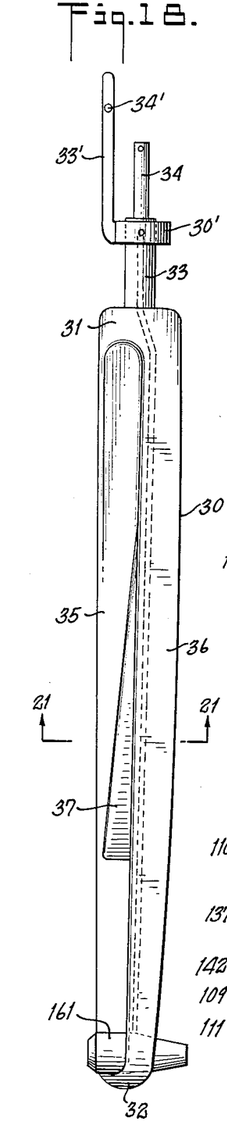
Fig. 18 is a bottom plan view of a rotor blade.
Figure 19:
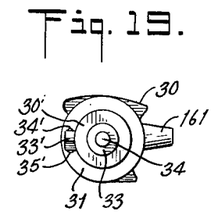
Fig. 19 is a rear end view thereof.
Figure 20:
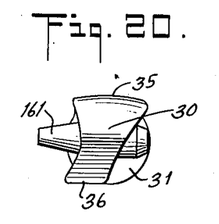
Fig. 20 is a front end view thereof.

Each rotor unit is driven by a turbo jet engine 153 secured to the top wall 20 of the fuselage body 5 adjacent the rotor unit by a bracket 154 or in any other suitable manner. The drive shaft 155 of the engine extends through an opening 156 in one of the upright portions 102 of the bracket 62. A pinion 157 is fastened to the inner end of the shaft and is in mesh with the bevel gear ring 24 on the bottom of the sleeve member 22. When the drive shaft 155 rotates, the drum, rotor blades, tank and associated parts rotate with it. The tube 73 with the disc camming members 89 and 94 remain stationary. Each turbo jet engine has an air inlet 158 at one end and an exhaust 159 at its other end. Reverse gearing indicated at 160 in Fig. 17 is mounted on the drive shaft 155 of the turbo jet engine 153 of the rear rotor unit so as to drive said rear unit in a direction opposite to the direction of movement of the front rotor unit.

In addition to the turbo jet engine 153, there is also provided a ram jet engine 161 in the nose portion 32 of each upper blade 30, and a similar ram jet engine 162 in the nose portion 54 of each lower blade 52. The ram jet engines in the blades are positioned in reverse directions so that the front rotor unit will rotate in a clockwise direction while the rear rotor unit rotates in a counter-clockwise direction as shown by the arrows in Fig. 1.

It will be understood that the turbo jet engines 153 which are connected to the drums are sufficient to drive the rotor units, but should such engines get out of order, the ram jet engines carried by the blades will turn the rotor units and drive the helicopter and vice versa so that there is always a margin of safety present not provided for in the prior art helicopters.

It will also be understood that the ram jet engines 161 carried by the blades will prevent the blades from becoming iced during freezing weather.

The fuel supply for the ram jet engines in the blades is carried by a main supply tank 163 suitably supported inside the fuselage body 5. An outlet pipe 164 leads from the bottom of the tank to and through an opening in the adjacent upright portion 80 of the closed frame member 77'. A flexible pipe or hose 165 is connected to the end of the pipe 164 and leads to an inlet member 166 rotatably mounted in a tank 167 rotatably mounted on ball bearings 168 on the top of the tube 73 inside the drum. The tank is fastened to the side wall 15 of the drum by brackets 169, each bracket having one end fixed to the tank and its other end slidably connected between the guide plates 170 on the tank (see Fig. 6) whereby the tank rotates with the drum but is permitted to slide up and down relative to the drum. A flexible hose 171 leads from an outlet in the tank 167 to an inlet opening 172 in the ring member 30' on each upper blade 30. The inlet openings in the ring member leads to an inlet opening 173 in the hub portion 33 of the blade and communicating with said latter inlet opening 173 is a pipe 174 extending through aligned openings in the hub portion 33 and base portion 31 of each upper blade. The pipe 174 extends along the lower plane of air foil 36 to the jet engine 161 in the nose portion 32 of the blade. Another flexible hose 175 leads from an outlet in the tank 167 to and through openings in the top and bottom walls 176 and 177, respectively, of the upper box-like portion 44 of each anchor member 41. The hose extends downwardly through the tubular portion 42 of the anchor member and through an opening in the top wall 178 of the bottom box-like portion 45 to an inlet opening 179 in the extension 56 of the lower blade 52. The inlet opening 179 leads to a pipe 181 extending through aligned openings in the extension 56, hub portion 55 and base portion 53 of the lower blade 52 and passing along the lower plane or air foil 60 to the jet engine 162 in the nose portion 54 of said lower blade.

The rotor blades are retracted by removing the holding bolts 38' and swinging the blades inwardly of the fuselage body 5, the grooves 39 and 40 on the bearing members 38 of the upper blades 30 riding over tracks 182 and 183, respectively, formed on the surface of the slotted portions 28 and 29 of the drum. When retracted, the blades assume the positions shown in full and dotted lines in Fig. 7. The space between the drum and the top wall 20 of the fuselage body is sufficient to permit the lower rotor blades to swing to retracted positions.

Figure 14:
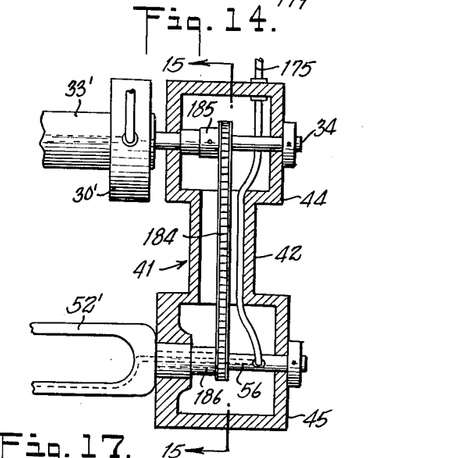
Fig. 14 is a vertical sectional view showing a modified form of drive between an upper blade and its associated lower blade.
Figure 15:
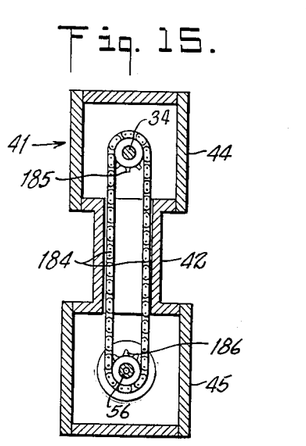
Fig. 15 is a similar view taken at right angles to Fig. 14, parts being omitted.

In Figs. 14 and 15, a modified form of mechanism for transmitting the pitch changing movement from the upper rotor blade 30 to the lower rotor blade 52' is illustrated comprising a chain 184 movable around gears 185 and 186 on the extensions 34 and 56, respectively, of the upper rotor blade and the lower rotor blade. The chain extends through the tubular portion 42 of the anchor member 41. In all other respects, the form of invention shown in Figs. 14 and 15 is similar to the form shown in Fig. 1 and similar reference numerals are used to indicate similar parts.

Figure 16:
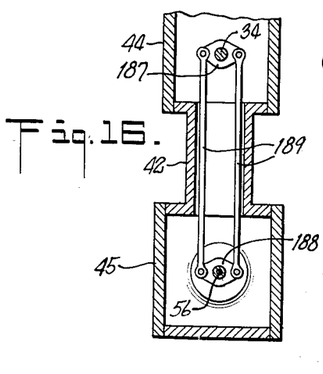
Fig 16 is a similar view of still another modified form of drive between the upper blade and its associated lower blade.

Fig. 16 shows a further modified form of mechanism for transmitting the pitch changing movement from the upper rotor blade to the lower rotor blade comprising oval-shaped plates 187 and 188 on the extensions 34 and 56 of the upper and lower blades, respectively, with rods 189 connecting the apex ends of the plates.

In all other respects, the form of invention shown in Fig. 16 is similar to the form shown in Fig. 1 and similar reference numerals are used to indicate similar parts.

In operation, the turbo jet engines or the ram jet engines or both drive the rotor units in their accurate paths for producing the necessary power for vertical lifting and for propelling the stream-lined fuselage body 5 forwardly through the air after it has obtained the necessary flying altitude.

In order to lift the helicopter to the necessary altitude for flight through the air, the pilot must manually change the pitch of the blades to a certain fixed angle. This is done in the form of actuating mechanism shown in Fig. 3, by manually turning the hand wheels 103 and 104 on the shafts 99 and 100, respectively. Rotation of the shafts 99 and 100 turns the gear rings 65 which in turn move the vertical tubes 73 of the front and rear rotor units upwardly and such movement of the tubes raises the upper and lower disc members 89 and 94, respectively, which movement is imparted to and raises the arm members 33' which in turn will tilt the blades to fixed angular positions causing the helicopter to be raised in the air.

In order to propel the helicopter forwardly through the air, the pilot must now lower the tubes 73 to normal downward positions and must change the cyclic pitch of the blades. This is done by turning the hand wheels 103 and 104 on the shafts 99 and 100, respectively, to lower the tubes 73. The hand wheels 105 and 106 on the shafts 138 and 139, respectively, are then turned in order to turn the gear rings 121, which rings move the shafts 120 upwardly. Upward movement of the shafts 120 will raise the camming plates 97 on the lower disc cams 94 to active camming positions over the lower disc cams. The inner ends of the arm members 33' are positioned to roll over these raised camming surfaces and because of their eccentric mounting will be tilted and will correspondingly tilt the blades thereby changing their cyclic pitch and the helicopter will move forwardly. The blades are thus tilted during each rotation of the drum. When the tubes 73 and shafts 120 are lowered, the blades return to inactive positions.

The pitch of the blades is absolutely controlled by the pilot through his control of the raising and lowering of the shafts 120 whereby the camming plates 97 and 91 are raised or lowered.

When using the modified actuating mechanism shown in Figs. 22, 23 and 24 for manipulating the controls, to lift the helicopter the pilot manually disconnects the bevel gears 144 and 145 from the bevel gears 110' and 111' and then manually turns the hand wheel 113 on the stub shaft 110, which is connected to shaft 99 leading to the front rotor unit. At the same time, the shaft 100 leading to the rear rotor unit is rotated because of the belt and pulley connection between the stub shafts 110 and 111. Rotation of the shafts 99 and 100 moves the vertical tubes 73 upwardly for changing the pitch of the blades and holding them in fixed position as heretofore described.

In order to propel the helicopter forwardly through the air, the pilot now lowers the tubes 73 to normal downward positions and simultaneously changes the cyclic pitch of the blades. This is done by manually sliding the bevel gear rings 144 and 145 on the stub shafts 142 and 143, respectively, into mesh with the bevel gear rings 110' and 111' on the stub shafts 110 and 111, respectively, by means of the hand wheels 148 and 149, respectively. When the bevel gear rings are all in mesh, turning of the hand wheel 113 on stub shaft 110 will turn all of the bevel gear rings and due to the teeth formation of the bevel gear rings, the shafts 110 and 111 will be turned in a direction to lower the tubes 73, and simultaneously the shafts 142 and 143 will be turned in the opposite direction to move the shafts 120 upwardly. Upward movement of the shafts will change the pitch as heretofore described.

Independent control of the cyclic pitch of the blades is readily accomplished by merely disconnecting the bevel gear rings 144 and 145 and by turning either or both of such gear rings when disconnected in order to raise or lower the shafts 120 together with the camming surfaces of camming plates 97 and 91, so as to give more or less pitch to the blades as desired. By controlling the pitch of the blades separately or together in each rotor unit, the pilot can easily control and direct the helicopter in the air.

While I have illustrated and described the preferred embodiments of my invention, it is to be understood that I do not limit myself to the precise constructions herein disclosed and the right is reserved to all changes and modifications coming within the scope of the invention as defined in the appended claims.

I claim:

1. In a helicopter, a fuselage, rotor units at the front and rear of the fuselage, each unit consisting of a rotatable drum, a tubular shaft formed integrally with the drum and depending therefrom, a jet engine operatively connected to said shaft for driving the same, upper and lower blades connected in pairs for simultaneous movement and tiltably carried by said drum, the corresponding blades of each pair being tiltable simultaneously, eccentric extensions on the upper blades, means for tilting said blades to change the pitch thereof including an axially movable tube supported by the fuselage and extending through said tubular shaft, spaced disc members carried by said axially movable tube inside the drum and disposed on opposite sides of said extensions, one of said disc members having a hinged camming section, the other of said disc members having a semi-circular plate loosely and movably carried on its surface, said upper cam section and said semi-circular plate being rigidly connected together, an axially movable shaft supported by the fuselage within said tube, means of connection between said latter shaft and the semi-circular movable plate for tilting said latter plate, and means for moving said latter shaft axially.

2. A helicopter as defined in claim 1 in which the means of connection between the axially movable shaft and movable plate includes a bar rigidly connected at one end to the shaft and flexibly connected at its other end to the movable plate.

3. A helicopter as defined in claim 1 in which the means for moving the axially movable shaft includes a gear on the end of the axially movable shaft, a worm in mesh with said gear, a rotatable shaft mounting said worm and a hand wheel on the end of said latter shaft for turning the same.

4. A helicopter as defined in claim 1 in which the means of connection between the axially movable shaft and movable plate includes a bar rigidly connected at one end to the axially movable shaft and connected at its other end to the movable plate and in which the means for moving the shaft axially includes a gear on the end of the latter shaft, a worm in mesh with said gear, a rotatable shaft mounting said worm and a hand wheel on the end of said latter shaft for turning the same.

5. A helicopter as defined in claim 1 in which the means for moving the shaft axially includes a worm gear ring on the end of the shaft, a worm in mesh with said gear ring, a rotatable shaft mounting said worm, a belt operatively connected to the rotatable shaft for turning the same and a hand wheel operatively connected to the belt for turning said belt.

6. In a helicopter, the combination of an elongated body of aero-dynamic shape, a rotor unit adjacent each end thereof, each unit including a tubular shaft member rotatably supported on the body, a drum fixed on the top end of each shaft member and communicating with the interior thereof, pairs of upper and lower blades radially disposed around each drum in spaced relation, the upper blades of the rear unit being disposed above the upper blades of the front unit with the tip path planes thereof overlapping, each of said blades being supported in its drum for oscillation on its long axis, means of connection between the upper and lower blades of each pair of blades whereby said blades rotate about the rotor axis and change pitch about their longitudinal axes, simultaneously, means for rotating the drums in opposite directions, means for changing the pitch angles of the blades of each rotor unit for elevating the body including an axially movable tube disposed in each tubular shaft member and projecting into the drum thereabove, spaced discs carried at the top of each tube inside the drum, an offset arm extension on the end of each upper blade inside the drum projecting between the discs, and a manually rotatable shaft supported by the body for moving each tube axially, and additional means for changing the pitch angles of the blades for propelling the body in a horizontal plane.

7. In a helicopter, the combination of an elongated body of aero-dynamic shape, a rotor unit adjacent each end thereof, each unit including a tubular shaft member rotatably supported on the body, a drum fixed on the top end of each shaft member and communicating with the interior thereof, pairs of upper and lower blades radially disposed around each drum in spaced relation, the upper blades of the rear unit being disposed above the upper blades of the front unit with the tip path planes thereof overlapping, each of said blades being supported in its drum for oscillation on its long axis, means for connection between the upper and lower blades of each pair of blades whereby said blades rotate about the rotor axis and change pitch about their longitudinal axes, simultaneously, means for rotating the drums in opposite directions, means for changing the pitch angles of the blades of each rotor unit for elevating the body including an axially movable tube disposed in each tubular shaft member and projecting into the drum thereabove, a pair of spaced discs carried at the top of each tube inside the drum, an offset arm extension on the end of each upper blade inside the drum projecting between the discs and a manually rotatable shaft supported by the body for moving each tube axially, and additional means for changing the pitch angles of the blades for propelling the body in a horizontal plane including movable camming devices formed on the discs adapted to engage said arm extensions on the blades, an axially movable shaft supported by the body extending through each axially movable tube, means of connection between the top end of said axially movable shaft and said camming devices, and a manually rotatable shaft supported by the body and operatively connected to the bottom end of each axially movable shaft for moving said shaft axially.

8. In a helicopter, the combination of an elongated body of aero-dynamic shape, a rotor unit adjacent each end thereof, each unit including a tubular shaft member rotatably supported on the body, a drum fixed on the top end of each shaft member and communicating with the interior thereof, pairs of upper and lower blades radially disposed around each drum in spaced relation, the upper blades of the rear unit being disposed above the upper blades of the front unit with the tip path planes thereof overlapping, each of said blades being supported in its drum for oscillation on its long axis, means of connection between the upper and lower blades at each pair of blades whereby said blades rotate about the rotor axis and change pitch about their longitudinal axes, simultaneously, means for rotating the drums in opposite directions, means for changing the pitch angles of the blades of each rotor unit for elevating the body including an axially movable tube disposed in each tubular shaft member and projecting into the drum thereabove, a pair of spaced discs carried at the top of each tube inside the drum, an offset arm extension on the end of each upper blade inside the drum projecting between the discs, manually controlled means supported by the body for simultaneously moving both tubes including a manually rotatable shaft supported by the body operatively connected to each tube, belts connecting said shafts and a hand wheel on each of said latter shafts for rotating the same for raising and lowering the tubes, and additional means for changing the pitch of the blades of both rotor units for propelling the body in a horizontal plane.

9. In a helicopter, the combination of an elongated body of aero-dynamic shape, a rotor unit adjacent each end thereof, each unit including a tubular shaft member rotatably supported on the body, a drum fixed on the top end of each shaft member and communicating with the interior thereof, pairs of upper and lower blades radially disposed around each drum in spaced relation, the upper blades of the rear unit being disposed above the upper blades of the front unit with the tip path planes thereof overlapping, each of said blades being supported in its drum for oscillation on its long axis, means of connection between the upper and lower blades of each pair of blades whereby said blades rotate about the rotor axis and change pitch about their longitudinal axes, simultaneously, means for rotating the drums in opposite directions, means for changing the pitch angles of the blades of each rotor unit for elevating the body including an axially movable tube disposed in each tubular shaft member and projecting into the drum thereabove, a pair of spaced discs carried at the top of each tube inside the drum, an offset arm extension on the end of each upper blade inside the drum projecting between the discs, manually controlled means supported by the body for simultaneously moving both tubes including a manually rotatable shaft supported by the body operatively connected to each tube, belts connecting said shafts and a hand wheel on each of said latter shafts for rotating the same for raising and lowering the tubes, and additional means for changing the pitch of the blades of both rotor units for propelling the body in a horizontal plane including axially movable shafts extending through said tubes, manually controlled means for simultaneously moving the latter axially movable shafts, said latter means including gears on said manually rotatable shafts, a turnable shaft operatively connected to each axially movable shaft, slidable gears on said turnable shafts adapted to be moved into mesh with the gears on the manually rotatable shafts and hand controlled means for selectively sliding said slidable gears whereby the cyclic pitch angles of the blades of both rotor units may be changed in unison or the blades of one rotor unit may be changed independently and separately.

10. In a helicopter, the combination of an elongated body of aero-dynamic shape, a rotor unit adjacent each end thereof, each unit including a tubular shaft member rotatably supported on the body, a drum fixed on the top end of each shaft member and communicating with the interior thereof, pairs of upper and lower blades radially disposed around each drum in spaced relation, the upper blades of the rear unit being disposed above the upper blades of the front unit with the tip path planes thereof overlapping, each of said blades being supported in its drum for oscillation on its long axis, means of connection between the upper and lower blades of each pair of blades whereby said blades rotate about the rotor axis and change pitch about their longitudinal axes, simultaneously, means for rotating the drums in opposite directions, means for changing the pitch angles of the blades of each rotor unit for elevating the body including an axially movable tube disposed in each tubular shaft member and projecting into the drum thereabove, a pair of spaced discs carried at the top of each tube inside the drum, an offset arm extension on the end of each upper blade inside the drum projecting between the discs, manually controlled means supported by the body for simultaneously moving both tubes including a manually rotatable shaft supported by the body operatively connected to each tube, belts connecting said shafts and a hand wheel on each of said latter shafts for rotating the same for raising and lowering the tubes, and additional means for changing the pitch of the blades of both rotor units for propelling the body in a horizontal plane including axially movable shafts extend through said tubes, manually controlled means for simultaneously moving the latter axially movable shafts, said latter means including gears on said manually rotatable shafts, a turnable shaft operatively connected to each axially movable shaft, a sleeve member slidably mounted on each of said turnable shafts, means for limiting the sliding movement of said sleeve members, a gear fixed on each of said sleeve members, the gears on said sleeve members being adapted to be moved into mesh with the gears on the manually rotatable shafts, hand wheels on the outer ends of the sleeve members for sliding said members to carry the gears thereon into mesh with the gears on the manually rotatable shafts whereby the cyclic pitch angles of the blades of both rotor units may be changed in unison or the blades of one rotor unit may be changed independently and separately.

11. In a helicopter, the combination of an elongated body of aero-dynamic shape, a rotor unit adjacent each end thereof, each unit including a tubular shaft member rotatably supported on the body, a drum fixed on the top end of each shaft member and communicating with the interior thereof, pairs of upper and lower blades radially disposed around each drum in spaced relation, the upper blades of the rear unit being disposed above the upper blades of the front unit with the tip path planes thereof overlapping, each of said blades being supported in its drum for oscillation on its long axis, means of connection between the upper and lower blades of each pair of blades whereby said blades rotate about the rotor axis and change pitch about their longitudinal axes, simultaneously, means for rotating the drums in opposite directions, means for changing the pitch angles of the blades of each rotor unit for elevating the body, and additional means for changing the pitch angles of the blades for propelling the body in a horizontal plane, each lower blade of a pair being arranged below the upper blade of the pair so that its leading edge is spaced rearwardly of the leading edge of the upper blade and its trailing edge is disposed behind the trailing edge of the upper blade whereby the air pushed down by the upper blade is utilized by the lower blade for additional lifting the body.

References Cited in the file of this patent

UNITED STATES PATENTS

| | | |
|---|---|---|
| 2,045,623 | Wilford | June 30, 1936 |
| 2,273,303 | Waldron | Feb. 17, 1942 |
| 2,389,798 | Main | Nov. 27, 1945 |
| 2,414,435 | Bendix | Jan. 21, 1947 |
| 2,432,391 | Davis | Dec. 9, 1947 |
| 2,437,165 | Locke | Mar. 2, 1948 |
| 2,472,917 | Nicolaeff | June 14, 1949 |
| 2,638,170 | Prewitt | May 12, 1953 |
| 2,640,549 | Isacco | June 2, 1953 |
| 2,663,371 | Magill | Dec. 22, 1953 |